(12) United States Patent
Iotti

(10) Patent No.: US 11,679,970 B2
(45) Date of Patent: Jun. 20, 2023

(54) TELEHANDLER WITH CONTROL SYSTEM

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 626 days.

(21) Appl. No.: 16/679,474

(22) Filed: Nov. 11, 2019

(65) Prior Publication Data

US 2020/0148518 A1 May 14, 2020

(30) Foreign Application Priority Data

Nov. 12, 2018 (IT) .................. 102018000010234

(51) Int. Cl.
| | |
|---|---|
| *B66F 9/075* | (2006.01) |
| *B66F 9/06* | (2006.01) |
| *B66F 9/065* | (2006.01) |
| *B66F 9/24* | (2006.01) |
| *B66F 11/04* | (2006.01) |
| *B62D 33/073* | (2006.01) |

(52) U.S. Cl.
CPC .......... *B66F 9/0755* (2013.01); *B62D 33/073* (2013.01); *B66F 9/06* (2013.01); *B66F 9/063* (2013.01); *B66F 9/0655* (2013.01); *B66F 9/07581* (2013.01); *B66F 9/24* (2013.01); *B66F 11/046* (2013.01)

(58) Field of Classification Search
CPC ...... B66F 9/063; B66F 11/046; B66F 9/0655; B66F 9/0755; B66F 9/07581; B66F 9/24; B66F 17/00; B66F 9/06; B66F 9/075; B66F 9/122; B66F 9/145; B66F 9/22; B62D 33/073
See application file for complete search history.

(56) References Cited

U.S. PATENT DOCUMENTS

| | | | | |
|---|---|---|---|---|
| 4,201,511 A | * | 5/1980 | Charles ................ | B66F 9/0655 294/81.1 |
| 4,755,102 A | * | 7/1988 | Merlo ................... | B66F 9/122 414/692 |
| 6,179,304 B1 | | 1/2001 | Ishikawa | |

(Continued)

FOREIGN PATENT DOCUMENTS

| | | |
|---|---|---|
| CN | 1218745 A | 6/1999 |
| CN | 102256892 A | 11/2011 |

(Continued)

*Primary Examiner* — Thomas Randazzo
(74) *Attorney, Agent, or Firm* — Pearne & Gordon LLP; J. Gregory Chrisman

(57) ABSTRACT

The self-propelled operating machine (1) is equipped with movable elements (10, 11, 13) which include a lifting arm (10) having an apparatus (13) and equipped with a plurality of actuators (20, 21, 22, 23) designed to actuate movements of the moving elements (10, 11, 13).

The machine comprises a control system which includes a processing unit (3) which comprises a control module (31) configured for producing control signals designed for adjusting the operation of the actuators (20, 21, 22, 23) on the basis of one or more spatial limiting parameters.

One or more of the limiting parameters is a function of spatial constraints for the movements of the above-mentioned elements.

23 Claims, 6 Drawing Sheets

(56) References Cited

U.S. PATENT DOCUMENTS

| | | | | |
|---|---|---|---|---|
| 6,244,450 B1* | 6/2001 | Woodling | ............ | B66C 23/705 |
| | | | | 212/231 |
| 6,272,413 B1* | 8/2001 | Takahashi | ............ | B66F 17/006 |
| | | | | 182/120 |
| 6,378,653 B1* | 4/2002 | Takahashi | ............ | B66F 11/046 |
| | | | | 182/62.5 |
| 8,833,519 B1* | 9/2014 | Glazer | ................ | B66F 11/046 |
| | | | | 182/2.11 |
| 11,193,287 B2 | 12/2021 | Tan | | |
| 2003/0173151 A1* | 9/2003 | Bodtke | ............... | B66F 17/006 |
| | | | | 182/2.11 |
| 2004/0040137 A1* | 3/2004 | Sewell | ................ | E02F 9/0833 |
| | | | | 29/428 |
| 2004/0069865 A1* | 4/2004 | Rowe | ................... | A62C 27/00 |
| | | | | 239/146 |
| 2004/0085184 A1* | 5/2004 | Sigmund | .............. | B66F 17/006 |
| | | | | 340/3.42 |
| 2004/0199302 A1* | 10/2004 | Pillar | ................... | B65F 3/045 |
| | | | | 701/1 |
| 2004/0210342 A1* | 10/2004 | Magni | ................. | B66F 9/0655 |
| | | | | 700/245 |
| 2005/0224439 A1* | 10/2005 | Bean | .................... | B66F 11/046 |
| | | | | 212/280 |
| 2008/0215190 A1* | 9/2008 | Pillar | ................... | B60T 17/221 |
| | | | | 701/1 |
| 2011/0299968 A1 | 12/2011 | Poulsen | | |
| 2014/0332294 A1* | 11/2014 | Soma' | ..................... | B60K 6/46 |
| | | | | 180/65.245 |
| 2017/0001846 A1* | 1/2017 | Paavolainen | ........... | B66C 13/40 |
| 2019/0039868 A1* | 2/2019 | Puszkiewicz | ......... | B66F 9/0755 |
| 2019/0144246 A1* | 5/2019 | Kaytes | .................. | B66F 9/0655 |
| | | | | 248/122.1 |
| 2019/0161286 A1* | 5/2019 | Hughes | ................ | B65G 11/183 |
| 2019/0242144 A1 | 8/2019 | Tan | | |
| 2020/0095102 A1* | 3/2020 | Uskoski | ................. | B66C 13/48 |
| 2020/0131741 A1* | 4/2020 | Lehmann | ............... | E02F 9/264 |
| 2020/0172384 A1* | 6/2020 | Cadou | .................. | B66F 17/003 |
| 2020/0207600 A1* | 7/2020 | Bonnefoy | ............. | B66F 11/042 |

FOREIGN PATENT DOCUMENTS

| | | |
|---|---|---|
| CN | 105036003 A | 11/2015 |
| CN | 109563715 A | 4/2019 |
| EP | 2684836 A1 | 1/2014 |
| RU | 65832 U1 | 8/2007 |
| RU | 171471 U1 | 6/2017 |

* cited by examiner

TELEHANDLER WITH CONTROL SYSTEM

FIELD OF THE INVENTION

The present invention relates to a telescopic handler, or "telehandler", equipped with a movement control system.

More in detail, the invention is intended especially for use with rotary telehandlers, although the inventive concept is also applicable to other types of self-propelled machines.

DESCRIPTION OF RELATED ART

Prior art telehandlers are known, consisting of a vehicle equipped with a "frame" or carriage that is movable on wheels, which comprises a rotary platform which in turn mounts the driver's cab and a movement arm which can be extended telescopically.

At the distal end of the arm there is an apparatus for lifting or moving loads, such as, for example, a fork, a cage, a lateral transfer unit, a winch, etc.

In use, in building sites or agricultural contexts, it is often necessary to perform for operators to perform repetitive operations or to move the load within precise spatial limits to prevent interference with elements of the surrounding environment.

For example, if the operations to which the telehandler is dedicated consist in moving, one by one, a plurality of pallets from a zone in which they are accumulated to a destination point which is at a different height, the operator must cyclically act on the actuators of the arm of the apparatus and of the platform so that it moves the fork from a same starting point, in which it is in position to insert in a new pallet to be moved, to an arrival point where the pallet can be released, for example to allow operators to perform manual loading.

In this case, although the operations are very repetitive and not particularly complex, the operator must act on the commands very scrupulously and with great concentration to avoid dangerous circumstances, such as the dropping of the load or an impact with the arm or apparatus of other vehicles or products present in the surrounding area and also to prevent unnecessary or too ample movements which result in a slowing down and therefore in a poor performance.

In another example, it can on the other hand happen that loads have to be moved in variable positions but following a predetermined direction or trajectory or variable trajectories but only within precise limits of the space surrounding the telehandler; for example, this may be requested in order to avoid the risk that the apparatus impacts against walls of buildings, other means of working such as cranes or other telehandlers or because there are transit zones of pedestrians or cars.

The fact that the limits or trajectories which constrain the movements of the arm and the apparatus are defined in a clear way and are constant does not allow the operator to simplify his/her work or to always avoid the maximum attention and reliability because, once again, the physical safety of the persons present on the work site, the integrity of the means and surrounding structures and the efficiency of the operations themselves depend on the movements that the operator imparts on the actuators by means of the commands in the cabin, for example using a joystick.

It is therefore a long-term and keenly-felt need in the market to improve efficiency and make it easier for the operator of a telehandler to carry out activities which are repetitive or are subject to limitations due to the context in which they are carried out.

SUMMARY OF THE INVENTION

The technical purpose forming the basis of the present invention is to provide a telehandler equipped with a control system of the movements which satisfies the above-described need.

The specified aim is attained by the invention made according to the claims herein.

BRIEF DESCRIPTION OF THE DRAWINGS

Further characteristics and advantages of the present invention will become more apparent in the non-limiting description of a preferred but non-exclusive embodiment of the proposed telehandler, as illustrated in the accompanying drawings, in which.

DETAILED DESCRIPTION OF PREFERRED EMBODIMENTS OF THE INVENTION

Figure 1:
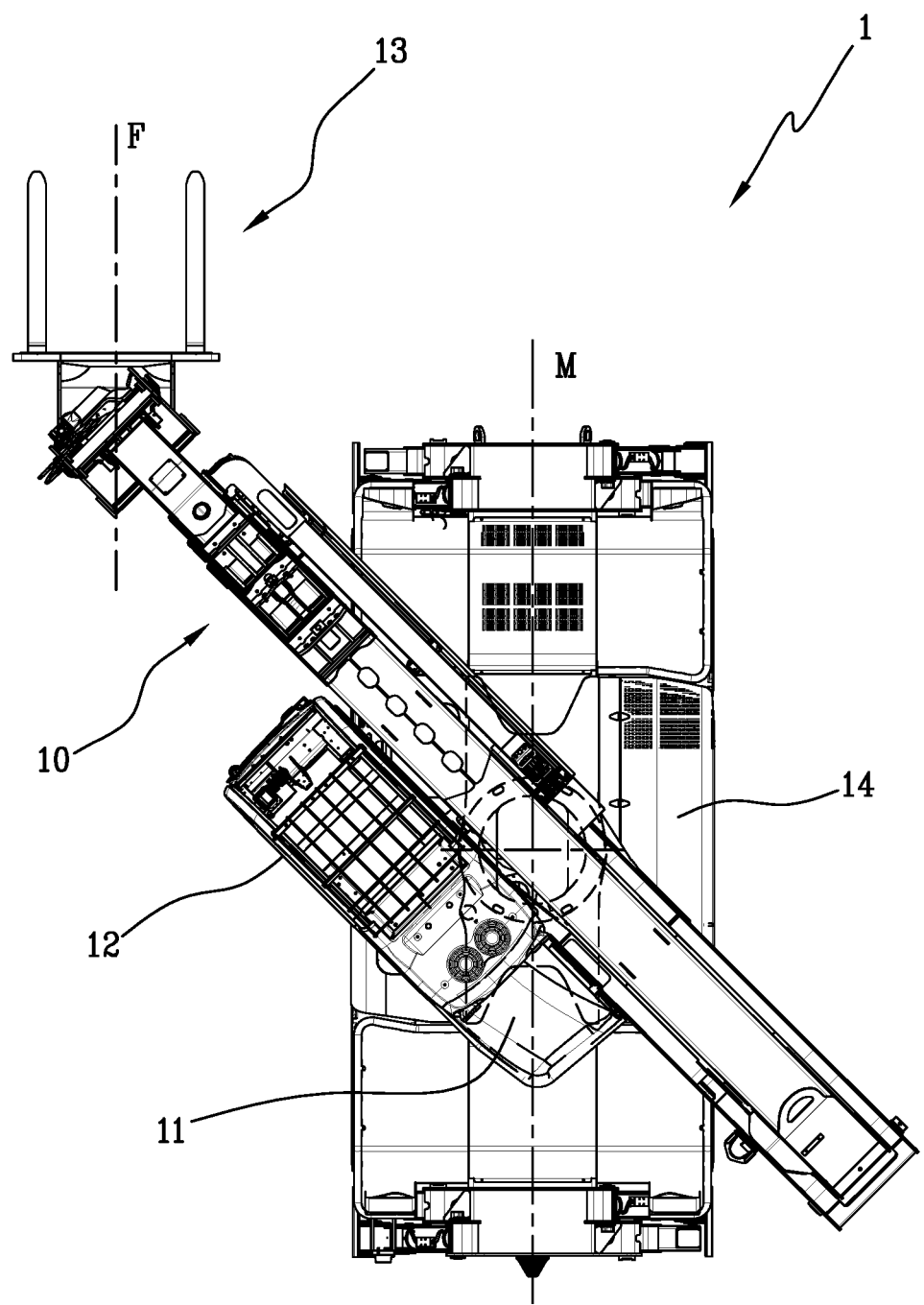
FIG. 1 is a top view of a telehandler of the invention, in a possible operating configuration managed by the proposed control system.

With reference to the accompanying figures of the drawings, reference numeral 1 denotes in its entirety a self-propelled operating machine which is equipped with the control system of the invention.

The machine shown in the figures is a rotary telehandler 1, equipped with a telescopic lifting arm 10 mounted on the rotary platform 11, which also houses the driver's cab 12; the arm 10 being equipped, at the distal end thereof, with a loading apparatus 13.

However, it is possible for the invention to be used with a different type of operating machine, generally equipped with moving elements which in any case include a lifting arm 10 and an apparatus 13.

The moving elements 10, 11, 13 are in practice components or apparatuses or devices of the machine 1 which are designed to move in space and the operation of which is subject to spatial constraints imposed by the control system of the invention; in other words, on the basis of some limitations on the movement in the pre-imposed or selected surrounding space, certain movements will be set for the moving elements 10, 11, 13, or certain movements will be allowed or prohibited.

In the following, reference will be made to the particular case in which the moving elements 10, 11, 13 managed by the control system are the platform 11, the telescopic arm 10 and the apparatus 13 of a telehandler 1 (see FIGS. 1-5).

The term apparatus 13 relates to both an accessory for engaging a load, such as a fork, a lateral transfer unit, a winch, a gripper, etc. and an accessory for lifting persons and possibly also a load, such as a cage.

Still more in detail, the arm 10 may have, at its distal end, an attachment device, also of the type normally in use in the telehandlers manufactured by the Applicant, which allows the replacement of the apparatus 13 and the connection thereof to the hydraulic and electronic apparatuses of the machine 1.

The arm 10 is hinged to the rotary platform 11, so as to oscillate vertically, on actuation of a hydraulic cylinder 20 (schematically illustrated in FIG. 6), or a like actuator, between a lower position, substantially horizontal, and an upper position wherein the arm 10 is close to the vertical.

The arm 10 is extensible and retractable and, more precisely, comprises a plurality of segments inserted one in the other, coaxial with one another and designed to translate along the axial direction.

The elongation and retraction of the arm 10 are also produced by one or more hydraulic cylinders 22, or other actuators.

The rotation of the platform 11 is also produced by a preferably hydraulic actuator 21, associated for example with a rack, in the same way that a preferably hydraulic actuator 23 also moves the apparatus 13 relative to one or more of its articulations.

In the example shown in the accompanying figures, the forks 13 are rotatable about a vertical axis or in any case perpendicular to the median central axis F thereof, so as to be able to oscillate, moving towards the right or towards the left.

The machine 1 also mounts an electro-hydraulic distributor to which the above-mentioned actuators 20, 21, 22, 23 are subject, according to known methods.

According to an important aspect of the invention, the control system includes a processing unit 3 which comprises a control module 31 configured for producing control signals designed to automatically adjust the operation of the above-mentioned actuators 20, 21, 22, 23 on the basis of one or more spatial limiting parameters, which are a function of spatial constraints imposed on the movements of the moving elements 10, 11, 13 of the machine 1, that is to say, the arm 10, the apparatus 13 and the platform 11.

The term "spatial constraints" relates to constraints on the position and/or orientation which one or more moving elements 10, 11, 13 may adopt, relative to a predetermined reference; for example, they may be geometrical constraints which refer to the relative position of the moving elements 10, 11, 13 relative to the carriage 14 of the machine 1.

Although reference will be made in the following to the case of the telehandler 1 wherein the spatial constraints are indicated in relation to the apparatus 13, thereby defining consequent constraints on the movements imparted to the arm 10 and to the platform 11 since they are joined two by two and articulated to one another, the constraints may be indicated with references to the arm 10 and/or to the platform 11 or to the geometrical configuration of the apparatus 13—arm 10—platform 11 unit.

The same concepts also extend to applications other than for rotary telehandlers, as already explained in the foregoing, with the due modifications.

In practice, the processing unit 3 transmits control signals to the distributor which consequently commands the actuators 20, 21, 22, 23, in such a way that they move the elements in accordance with certain conditions, for example the orientation of the apparatus 13, or distance from the frame 14 of the machine 1 or from elements located in the surrounding space or permitted zones of space and prohibited zones for the positioning the apparatus 13 and so on; some practical examples of these spatial constraints will be illustrated in the following, after having more fully illustrated some structural and functional aspects of the invention.

In detail, the control system acts in conjunction with the control system of the moving elements 10, 11, 13, of per se known type and therefore not described herein in detail, which allows the operator to carry out the requested operations.

In practice, the machine 1 of the invention includes a known control system equipped with controls in the cab, such as joystick, pedals, pushbuttons, etc., actuated by the operator; by acting on the controls, signals received from the distributor are generated which then adjusts the operation of the actuators 20, 21, 22, 23 of the arm 10, the apparatus 13 and the platform 11 (or other moving elements 10, 11, 13).

In the invention, the processing unit 3 also receives the drive signals from the commands in the cabin and, as a function of the limiting parameters acquired, automatically determines constraints to the behaviour of the actuators 20, 21, 22, 23 and, therefore, of the moving elements 10, 11, 13; this aspect will be further considered in the following paragraphs.

Generally speaking, it should be noted that, in the present description, the processing unit 3 is presented as being subdivided into separate functional modules solely for the purpose of describing the functions clearly and completely.

In practice, the processing unit 3 may be constituted by a single electronic device, also of the type commonly present on this type of machine, suitably programmed to perform the functions described; the various modules can correspond to hardware units and/or software routines forming part of the programmed device.

Alternatively or in addition, the functions can be performed by a plurality of electronic devices on which the above-mentioned functional modules can be distributed.

Generally speaking, the processing unit 3 may have one or more microprocessors or microcontrollers for execution of the instructions contained in the memory modules and the above-mentioned functional modules may also be distributed on a plurality of local or remote calculators based on the architecture of the network in which they reside.

According to an advantageous feature of the invention, the control system includes acquisition means 4, connected to the processing unit 3, designed for acquiring the above-mentioned limiting parameters.

The acquisition means 4 are designed to produce limiting signals as a function of these parameters, which are received from the control module 31 of the processing unit 3 which consequently constrains the movements of the elements of the machine 1.

Figure 6:
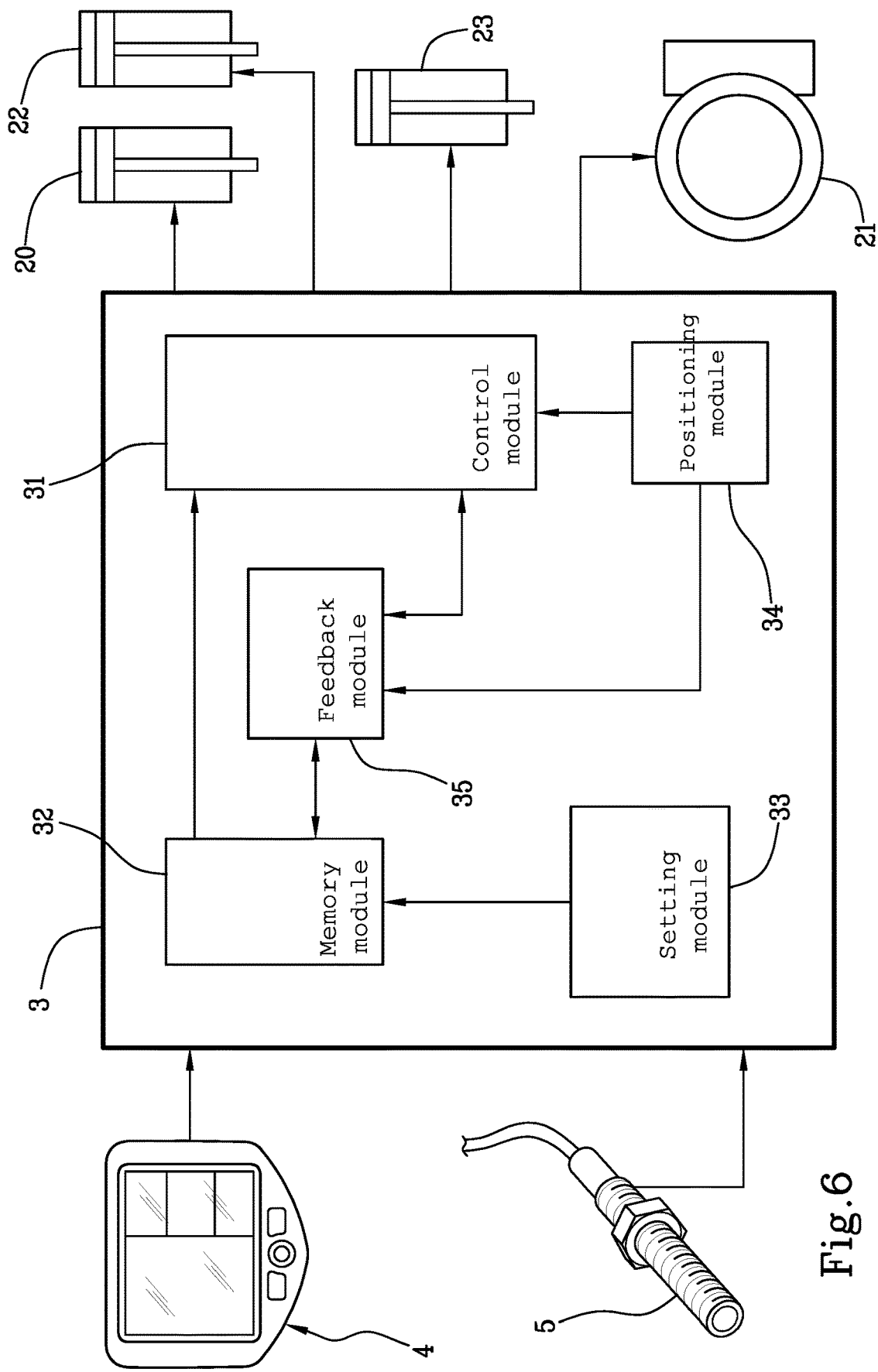
FIG. 6 is a diagram representing the processing unit of the invention.

For example, as shown schematically in FIG. 6, the acquisition means may include a user interface 4 which allows the operator to enter or select limiting parameters.

In detail, the interface 4 may be accessible from inside the driver's cab, for example by means of a touchscreen display, acting on graphic indexes or by means of more traditional commands such as knobs, pushbuttons or levers.

The user interface 4 may be configured to select the desired spatial constraint between a plurality of preset spatial constraints and recorded in a memory module 32 of the processing unit 3, using a menu of choice or the like and/or to allow the operator to set the desired constraints, on the basis of the specific context in which the machine 1 is to operate at the moment.

The interface 4 is therefore able to transmit selecting signals to the processing unit 3, as a function of the choices made by the operator.

Further, the processing unit 3 can include a setting module 33 configured for recording an arrangement for the moving elements 10, 11, 13 which has been set by the operator, using the interface means 4 and thereby defining it as the predetermined arrangement.

In addition or alternatively, the acquisition means 4 may include sensors located on the machine 1, for example on the frame, on the apparatus 13 or on other elements and designed to acquire measurements on the surrounding space; for example, they might be present on the apparatus 13 or on the arm 10 of the sensors which measure the distance between these and any obstacles or products or in any case elements present in the surroundings.

For example, there may be distance sensors located at one or more points of the machine 1, for example on the moving elements 10, 11, 13, on the rotary platform 11, on the carriage 14 below, etc., which transmit distance signals to the processing unit 3, a function of the distance relative to elements of the surrounding space, designed to define spatial constraint parameters for the movements of the units 10, 11, 13.

In this way, as a function of the constraining parameters acquired by the interface 4 and those acquired by the sensors, the control module 31 can command the distributor in consequence to adjust the actuators 20, 21, 22, 23, also taking into account the actuation of the commands by the operator in the cabin.

It should also be noted that the proposed machine 1 also includes a plurality of position measuring devices 5 (shown in stylised form in FIG. 6) designed to determine the current position of the moving elements 10, 11, 13.

The position measuring devices 5 are connected to the processing unit 3 and can in practice be displacement sensors integrated in the linear hydraulic actuators 20, 21, 22, 23 or encoders and phonic wheels for the rotational movements, or microswitches or proximity sensors which are able to fix stroke limits.

In any case, the devices 5 are designed to generate respective position signals received from the processing unit 3, which includes a positioning module 34 configured for determining, instant by instant, the current spatial arrangement of the respective moving elements 10, 11, 13.

In this case, the control module 31, mentioned several times in the foregoing, is subject to the positioning module 34 and is configured for producing its control signals also on the basis of the arrangement of the moving elements 10, 11, 13 determined by the positioning module 34.

More specifically, the processing unit 3 may also include a feedback module 35 designed to receive the control signals and the position signals and configured to cyclically carry out a comparison between the current arrangement determined by the positioning module 34 and a target arrangement of the moving elements 10, 11, 13, the control module 31 being configured to perform periodic corrections of the operation of the actuators 20, 21, 22, 23, in such a way that the actual arrangement of the moving elements 10, 11, 13 corresponds to the desired one.

Further, the telehandler 1 of the invention is equipped with a safety system correlated with the loads moved, to which the proposed control system is subordinated, which may also be of known type, designed for the safety of the movements of the vehicle; in detail, the safety system makes it possible to move the loads in compliance with the known load diagrams and prevents the occurrence of an instability of the vehicle, for example of the frontal type.

Further, as mentioned, the processing unit 3 includes a memory module 32 in which at least one predetermined spatial arrangement is recorded for the above-mentioned moving elements 10, 11, 13; in general, in the memory module 32 there may be a set of arrangements or configurations of the moving elements 10, 11, 13, taken individually or in their entirety.

According to a preferred aspect, the control module 31 is configured for producing control signals designed to automatically move the moving elements 10, 11, 13 into a predetermined arrangement stored in the processing unit 3.

In one case, this predetermined arrangement or configuration is selected using the interface module 4, for example by touching a graphical index (an icon or a string of characters or the like) present in a menu of the display.

In other cases, the triggering event could be different and not linked to the choices of the operator.

For example, it could be a function of the measurements performed by the above-mentioned distance sensors or other sensors.

In other words, there may be a case of manual selection which starts movements of the actuators 20, 21, 22, 23 in such a way that the moving elements 10, 11, 13 automatically position themselves in a predetermined arrangement; this is a particularly useful option in the case of performing repetitive operations as discussed in the introduction.

However, it may also be assumed that, for safety reasons or other reasons, when certain circumstances act as triggers, the elements will arrange themselves in a certain manner that is known and determined in advance.

In order to be able to precisely determine the spatial arrangements which satisfy the set constraints, one or more spatial references can be recorded in the memory module 32, so that the above-mentioned limiting parameters are in practice defined by the possible arrangements of the moving elements 10, 11, 13 with respect to these references.

For example, as reference, it is possible to take a median central axis M of the machine 1 or a specific point along the axis.

In this case, the geometrical constraint can be selected as the parallelism between a median central axis F of the apparatus 13 and the central axis M of the machine 1, as in the two practical examples which are illustrated in the following.

Figure 2:
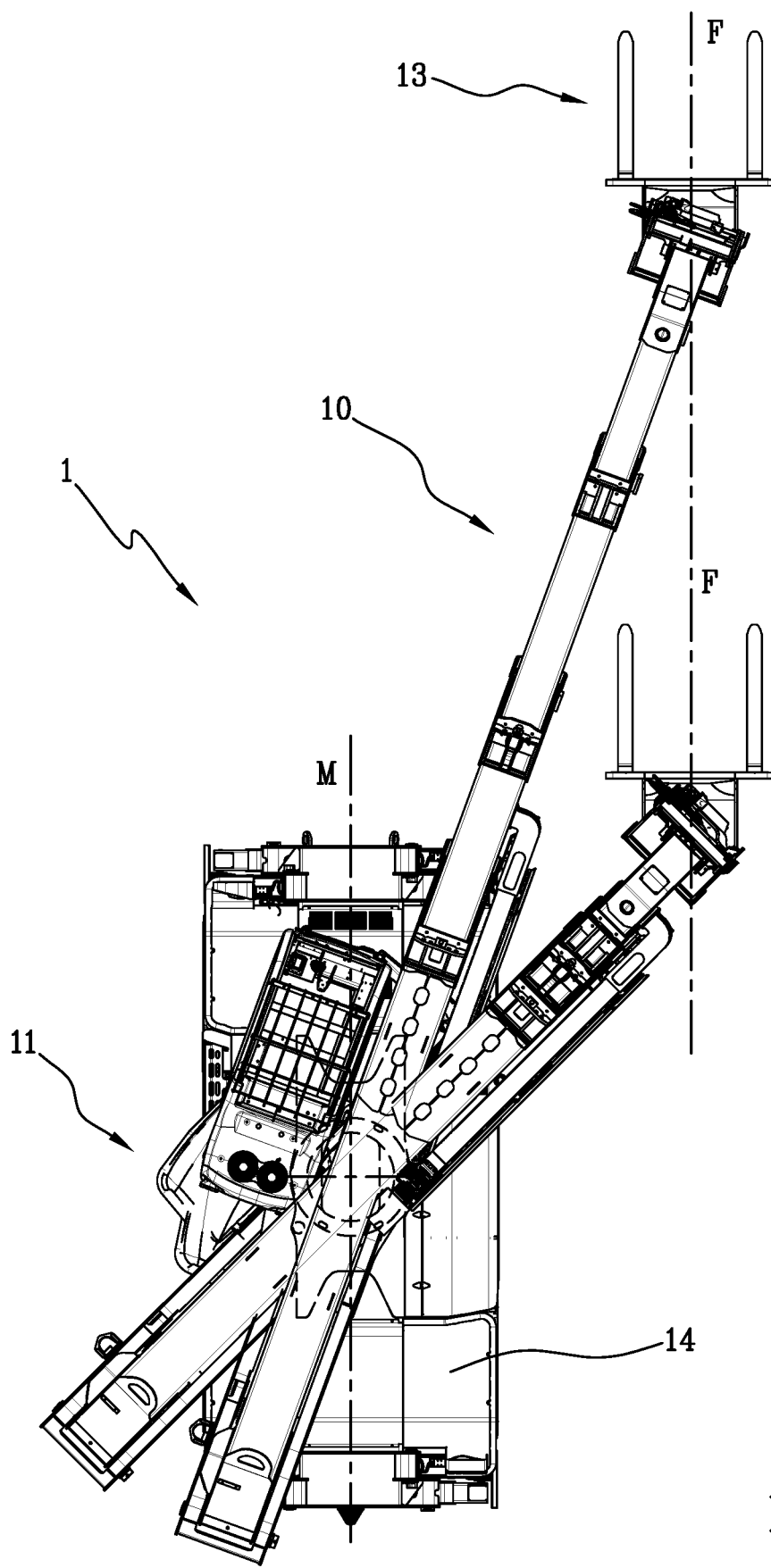
FIG. 2 is a top view of the telehandler of FIG. 1 which shows possible movements managed by the control system.

In the event that it is necessary to operate close to a wall or similar obstacles, it is possible to move the carriage 14 of the machine 1 close to the wall, moving the apparatus 13 to a suitable distance from the wall and then setting the geometrical constraint that it can always move with its axis F parallel to the axis M of the carriage 14 (see FIG. 2).

In this way, the operator can move the load collected by the apparatus 13, with high speed and in safety, providing that the processing unit 3 controls the actuators 20, 21, 22, 23 in such a way that the apparatus 13 always remains parallel to the wall and slides always to the distance which has been set using the interface means 4, or pre-recorded as the preferential distance in the memory module 32.

In practice, when the fork 13 is advanced, the platform 11 rotates away from the wall, the arm 10 extends and the fork 13 compensates by rotating outwards; vice versa, the movements are reversed when the load is moved backwards.

Note that this operation could also be performed using references different from the axis M of the carriage 14 of the machine 1, but equivalent from the operational point of view.

Further, in the case of the repetitive activity described in the context of the prior art, that is to say, the operation of moving, one by one, a plurality of pallets from a zone in which they are accumulated to a destination point, it is possible to pre-set a starting position in which the forks 13 are positioned in front of the group of pallets, for example oriented in such a way as to be parallel to the axis M of the carriage 14 of the machine 1 (see FIG. 1).

Therefore, each time the operator has to load a new pallet, it is sufficient for the starting position to be selected using the interface 4 and the platform 11, the arm 10 and the apparatus 13 to be automatically positioned in the starting configuration, ready for forking a new pallet.

This arrangement of the moving elements 10, 11, 13 may have been established in advance by the manufacturer or it may be set up at the time by the operator and recorded in the memory module 32 by means of the above-mentioned setting module 33.

Again, from the functional point of view the same result can be obtained having as reference a geometrical element that is different to the axis of the carriage of the telehandler 1.

Figure 3:
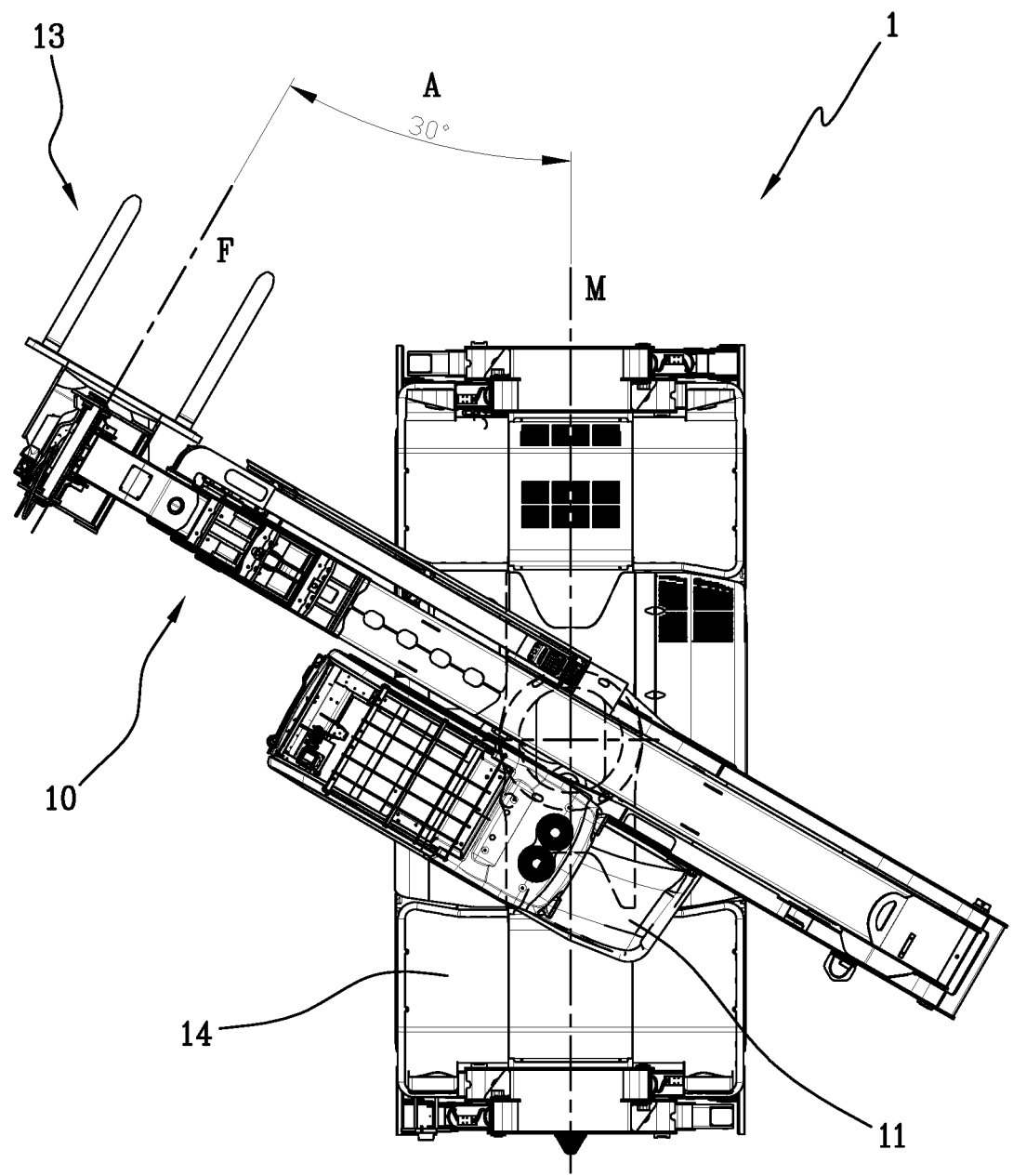
FIGS. 3-5 are top views of the machine of the preceding figures, which represent possible movements controlled by the invention.
Figure 4:
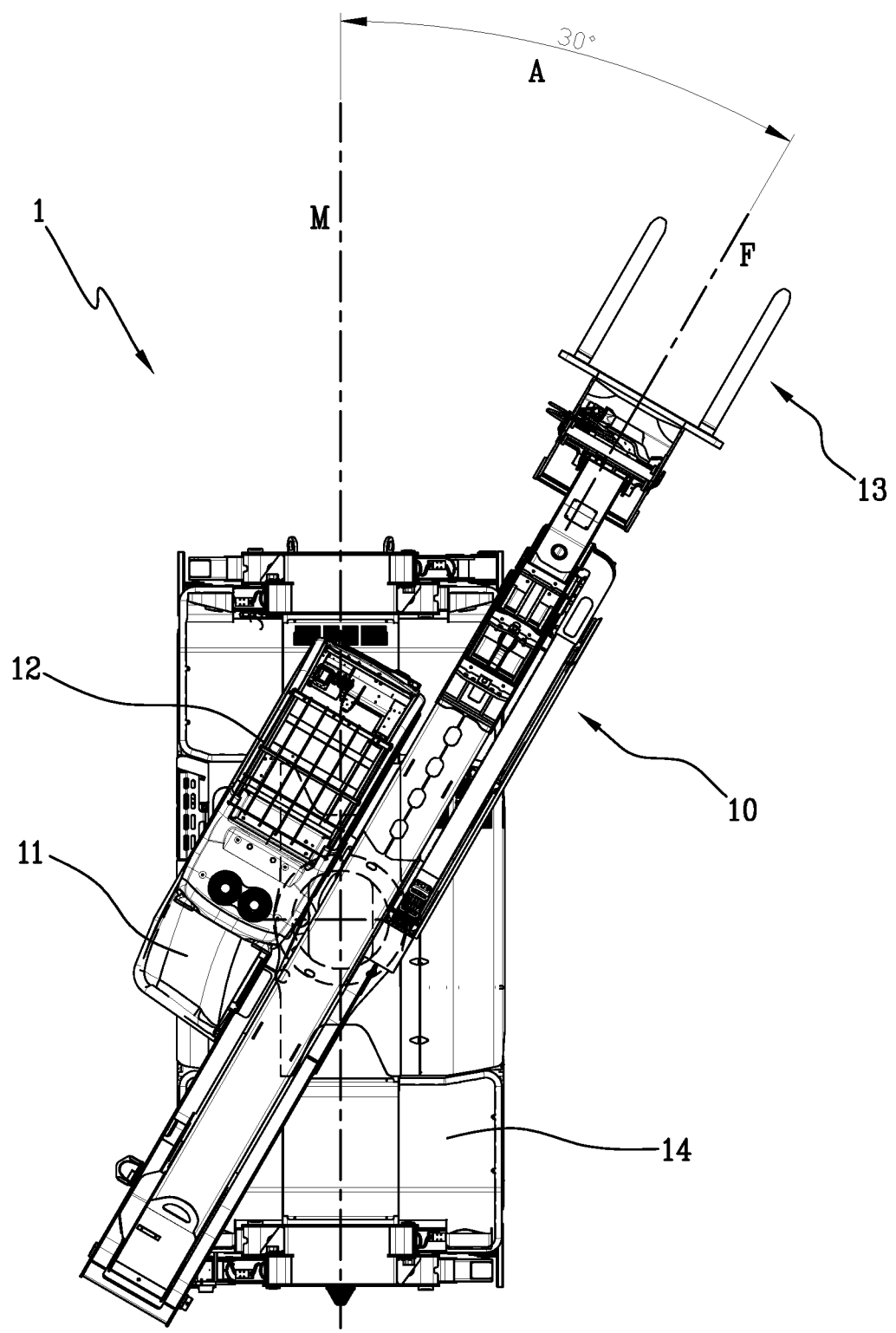
Figure 5:
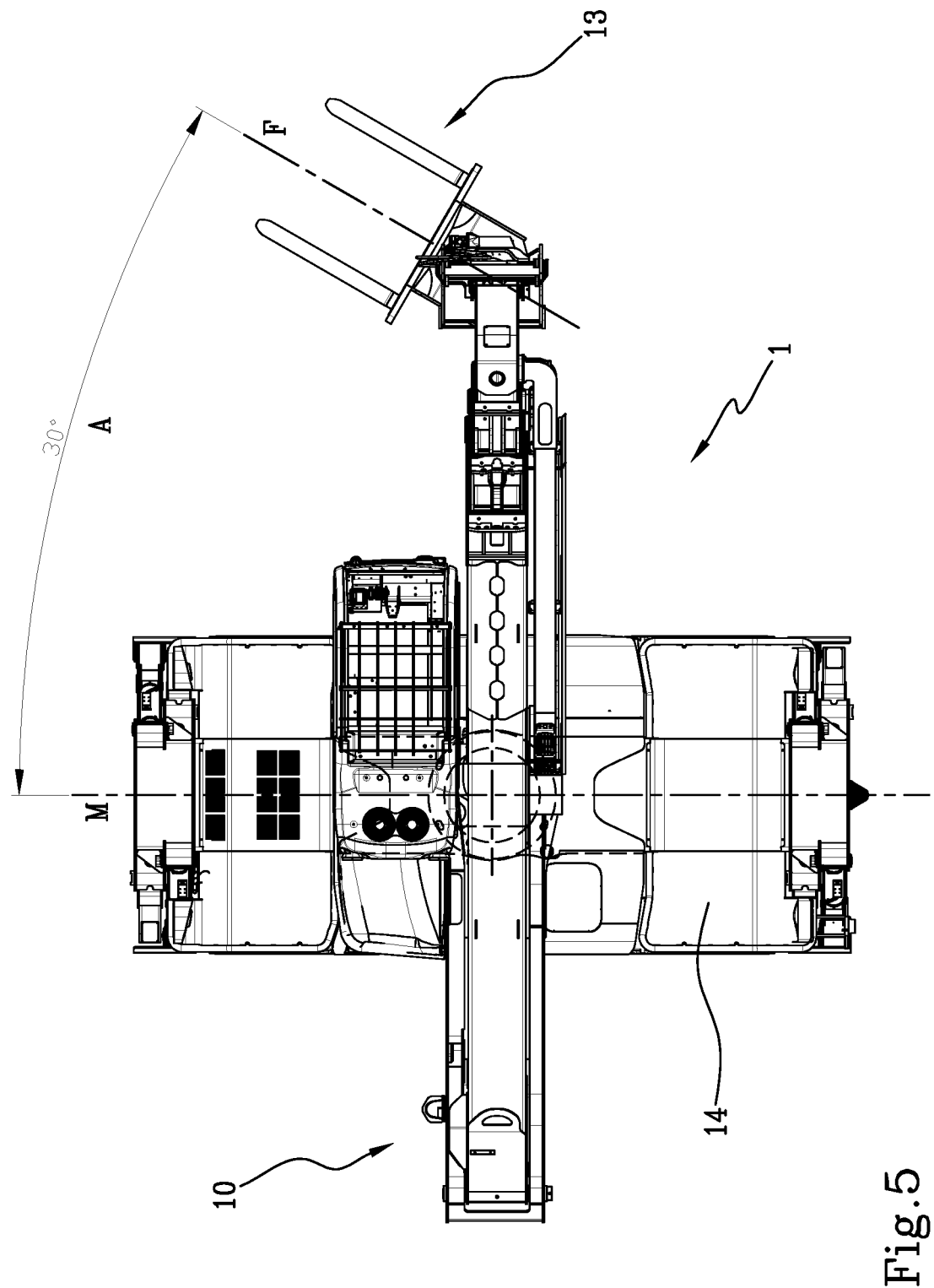

According to another application mode, a geometrical constraint may be set consisting of a predetermined angle A between the axis of the apparatus 13 and the axis M of the machine 1, as shown in FIGS. 3, 4 and 5, wherein the selected angle A is, by way of example, 30°.

Owing to this feature, errors in estimating the possible interference between the apparatus 13 and objects in the surrounding environment are avoided, when the platform 11 is rotated, in operations in which a predetermined safety radius has been established; in fact, it may not be sufficient to keep the length of the arm 10 fixed because if the apparatus 13 has a random orientation then, in certain angular positions of the arm 10 relative to the axis of the carriage, it might protrude beyond the safety area and strike elements present in the surrounding environment.

In general, it may also be possible to store in the processing unit 3 a reference system centred in the machine 1, for example in half of the central axis M of the carriage 14 and, setting as constraining parameters the coordinates adopted with respect to that reference, establish limits of the surrounding space which cannot be surpassed by the apparatus 13.

The invention is also configured as a method for controlling moving elements 10, 11, 13 of a self-propelled operating machine, preferably configured like the one described in the foregoing.

The method includes the following steps:

acquiring one or more limiting parameters as a function of spatial constraints for the movements of the moving elements 10, 11, 13 of the machine 1; and automatically adjusting the operation of the moving elements 10, 11, 13 as a function of the spatial limiting parameters.

Optionally, the method includes operating steps corresponding to the respective functions performed by the components of the machine 1 of the invention, with particular but not exclusive reference to the modules of the processing unit 3 and to the sensors or other measuring and acquisition devices.

Further, a computer program which, when run on electronic processing means, implements the above-mentioned method, is to be considered fully covered in the proposed inventive concept.

The invention claimed is:

1. A self-propelled operating machine (1), said machine (1) being a rotary telescopic telehandler (1), said telehandler (1) comprising moving elements (10, 11, 13), said moving elements (10, 11, 13) comprising a rotary platform (11), a lifting arm (10) which is telescopic and an apparatus (13) which is mounted at a distal end of the lifting arm (10), the lifting arm (10) and a driver's cab (12) being mounted on the rotary platform (11), the telehandler (1) being equipped with a plurality of actuators (20, 21, 22, 23) effective to actuate movements of the moving elements (10, 11, 13); the telehandler (1) further comprising a control system which includes a processing unit (3) which comprises a control module (31) configured for producing control signals effective to regulate the operation of the actuators (20, 21, 22, 23) on the basis of one or more spatial limiting parameters; at least one of the spatial limiting parameters being a function of spatial constraints for the movements of the moving elements; wherein the control system is configured such that an operator, while located in the driver's cab, can (A) drive the telehandler forward or backward, (B) see the lifting arm (10), and (C) enter or select, via a user interface (4), one or more of the spatial limiting parameters; wherein the control module (31) is configured for producing control signals effective to (A) prevent movement of the lifting arm (10) or the apparatus (13) into one or more preselected locations in a surrounding space, (B) prevent the lifting arm (10) and the apparatus (13) from being extended or retracted or moved to one or more preselected locations where there can be an interference with an element of a surrounding environment, or (C) control the movement of the apparatus (13) so that it returns repetitively to a same location or same starting or ending point.

2. The machine (1) according to claim 1, comprising a first actuator (20) for lifting and lowering the lifting arm (10) and at least a second actuator (22) for extending or withdrawing the length of the lifting arm (10).

3. The machine (1) according to claim 1, wherein the apparatus (13) is rotatable under the actuation of a third actuator (23).

4. The machine (1) according to claim 1, wherein a fourth actuator (21) is provided for operating the rotary platform (11) in a rotary fashion.

5. The machine (1) according to claim 1, wherein the processing unit (3) includes a memory module (32) in which is recorded at least one predetermined spatial arrangement for the moving elements (10, 11, 13), wherein the control module (31) is configured for producing control signals effective to automatically move the moving elements into the predetermined spatial arrangement.

6. The machine (1) according to claim 1, wherein at least one spatial constraint is a predetermined angle between an axis of the apparatus (13) and a central axis of the machine (1).

7. The machine (1) according to claim 1, wherein the apparatus (13) is a loading apparatus which is effective for lifting or moving a load.

8. The machine (1) according to claim 1, wherein the apparatus (13) is an apparatus selected from the group consisting of a fork, a cage, a lateral transfer unit, a winch and a gripper.

9. The machine (1) according to claim 1, wherein the element of the surrounding environment is selected from the group consisting of a wall of a building, a piece of equipment, a crane, a telehandler, a person and a car.

10. The machine (1) according to claim 1, wherein the control module (31) is configured for producing control signals effective to control the movement of the apparatus (13) so that it returns repetitively to a same location or same starting or ending point.

11. The machine (1) according to claim 1, wherein the apparatus (13) is a fork; wherein the fork has a median central axis (F); wherein the machine (1) has a central axis (M); and wherein the control system is programmed to move the fork in such a way that the median central axis (F) of the fork remains parallel to the central axis (M) of the machine (1).

12. The machine (1) according to claim 1, wherein the control system comprises means (4) for acquiring the spatial limiting parameters designed to produce limiting signals as a function of the spatial limiting parameters, the control module (31) being configured to receive the limiting signals.

13. The machine (1) according to claim 12, wherein the means (4) for acquiring includes a user interface (4) which is configured so as to allow the operator to enter or select one or more of the spatial limiting parameters.

14. The machine (1) according to claim 1, comprising a plurality of position measuring devices (5) configured to determine a position of the moving elements (10, 11, 13), the position measuring devices (5) being configured to generate respective position signals, wherein the processing unit (3) is configured to receive the position signals and includes a positioning module (34) configured to determine a current spatial arrangement of the moving elements (10, 11, 13), the control module (31) being configured for producing the control signals on the basis of the spatial arrangement of the moving elements (10, 11, 13) determined by the positioning module (34).

15. The machine (1) according to claim 14, wherein the processing unit (3) includes a feedback module (35) configured to receive the control signals and the position signals and configured to execute a comparison between a current spatial arrangement determined by the positioning module and a target spatial arrangement of the moving elements (10, 11, 13), the control module (31) being configured for executing corrections to the operation of the plurality of actuators (20, 21, 22, 23).

16. The machine (1) according to claim 1, wherein a memory module (32) included in the processing unit (3) records one or more spatial references (M) for calculating a spatial arrangement of the moving elements (10, 11, 13), the spacial limiting parameters being defined by spatial arrangements of one or more of the moving elements relative to the spatial references (M).

17. The machine (1) according to claim 16, wherein at least one spatial reference (M) is a central axis of the machine (1) and a spatial constraint of at least one parameter is a parallelism between an axis of the apparatus (13) and the central axis of the machine (1).

18. The machine (1) according to claim 1, wherein the control system is programmed to control the movement of the lifting arm (10) so that, during operation, the lifting arm (10) moves left or right, up or down, and extends forward or retracts backwards, all the while the apparatus (13) following a path which does not extend beyond a preselected boundary.

19. The machine (1) according to claim 18, wherein the preselected boundary includes a boundary (a) which is defined by a plane apart from the telehandler (1) or (b) which extends parallel to a longitudinal axis of the telehandler (1).

20. The machine (1) according to claim 1, wherein the apparatus (13) is a fork and wherein the control system is programmed to move the fork repetitively to a same location or same starting point or ending point.

21. The machine (1) according to claim 20, wherein the control system is programmed to move the fork to pick up a pallet at the starting point or deposit a pallet at the ending point.

22. A method for controlling a self-propelled operating machine, said self-propelled operating machine (1) being a rotary telescopic telehandler (1), said telehandler (1) comprising moving elements (10, 11, 13), said moving elements (10, 11, 13) comprising a rotary platform (11), a lifting arm (10) which is telescopic and an apparatus (13) which is mounted at a distal end of the lifting arm (10), the lifting arm (10) and a driver's cab (12) being mounted on the rotary platform (11), the telehandler (1) being equipped with a plurality of actuators (20, 21, 22, 23) effective to actuate movements of the moving elements (10, 11, 13); the telehandler (1) further comprising a control system which includes a processing unit (3) which comprises a control module (31) configured for producing control signals effective to regulate the operation of the actuators (20, 21, 22, 23) on the basis of one or more spatial limiting parameters; at least one of the spatial limiting parameters being a function of spatial constraints for the movements of the moving elements; wherein the control system is configured such that an operator, while located in the driver's cab, can (A) drive the telehandler forward or backward, (B) see the lifting arm (10), and (C) enter or select, via a user interface (4), one or more of the spatial limiting parameters; wherein the control module (31) is configured for producing control signals effective to (A) prevent movement of the lifting arm (10) or the apparatus (13) into one or more preselected locations in a surrounding space, (B) prevent the lifting arm (10) and the apparatus (13) from being extended or retracted or moved to one or more preselected locations where there can be an interference with an element of a surrounding environment, or (C) control the movement of the apparatus (13) so that it returns repetitively to a same location or same starting or ending point, said method comprising the following steps: acquiring one or more limiting parameters as a function of said spatial constraints for the movements of the moving elements (10, 11, 13);

automatically adjusting the operation of the moving elements (10, 11, 13) as a function of the spatial limiting parameters.

23. A computer program which, running on electronic processing means, actuates a method for controlling a self-propelled operating machine, said machine (1) being a rotary telescopic telehandler (1), said telehandler (1) comprising moving elements (10, 11, 13), said moving elements (10, 11, 13) comprising a rotary platform (11), a lifting arm (10) which is telescopic and an apparatus (13) which is mounted at a distal end of the lifting arm (10), the lifting arm (10) and a driver's cab (12) being mounted on the rotary platform (11), the telehandler (1) being equipped with a plurality of actuators (20, 21, 22, 23) effective to actuate movements of the moving elements (10, 11, 13); the telehandler (1) further comprising a control system which includes a processing unit (3) which comprises a control module (31) configured for producing control signals effective to regulate the operation of the actuators (20, 21, 22, 23) on the basis of one or more spatial limiting parameters; at least one of the spatial limiting parameters being a function of spatial constraints for the movements of the moving elements; wherein the control system is configured such that an operator, while located in the driver's cab, can (A) drive the telehandler forward or backward, (B) see the lifting arm (10), and (C) enter or select, via a user interface (4), one or more of the spatial limiting parameters; wherein the control module (31) is configured for producing control signals effective to (A) prevent movement of the lifting arm (10) or the apparatus (13) into one or more preselected locations in a surrounding space, (B) prevent the lifting arm (10) and the apparatus (13) from being extended or retracted or moved to one or more preselected locations where there can be an interference with an element of a surrounding environment, or (C) control the movement of the apparatus (13) so that it returns repetitively to a same location or same starting or ending point;
    the method comprising the following steps:
        acquiring one or more spatial limiting parameters as a function of said spatial constraints for the movements of the moving elements (10, 11, 13);
        automatically adjusting the operation of the moving elements (10, 11, 13) as a function of the spatial limiting parameters.

* * * * *